United States Patent [19]
Bach

[11] 3,974,355
[45] Aug. 10, 1976

[54] METHOD FOR EFFECTING UNIFORM HEATING OF AN ORGANIC PRODUCT PARTICULARLY FOR THE PURPOSE OF PRESERVING THE PRODUCT AND APPARATUS THEREFOR

[76] Inventor: Jean Bach, Waldstrasse 19, 8032 Munich-Grafelfing, Germany

[22] Filed: May 6, 1975

[21] Appl. No.: 575,016

[30] Foreign Application Priority Data
May 9, 1974  Germany............................ 2422530

[52] U.S. Cl........................ 219/10.81; 219/10.55 A
[51] Int. Cl.²......................................... H05B 9/04
[58] Field of Search............. 219/10.55 R, 10.55 A, 219/10.55 M, 10.81, 10.53, 10.57

[56] References Cited
UNITED STATES PATENTS

| | | | |
|---|---|---|---|
| 2,485,660 | 10/1949 | Robertson.................... | 219/10.81 X |
| 2,823,293 | 7/1974 | Gilliatt......................... | 219/10.81 X |
| 2,838,640 | 6/1958 | Mann et al................... | 219/10.81 X |

Primary Examiner—Arthur T. Grimley
Attorney, Agent, or Firm—Michael J. Striker

[57] ABSTRACT

An organic product is located in a closed container in which a gas occupies the space inside the container above the product. The container is immersed into a liquid having a low dielectric loss factor, such as water, to such an extent that the liquid level is somewhat below the upper side of the product in the container. Using electrodes located to either side of the container, there is passed through the container from one side thereof to the other a first high-frequency electromagnetic alternating field having a respective first frequency such that the penetration depth of said first field is at least as great as the width of the container. From that side of the container at which the gas filled portion thereof is located, there is passed into the container through the gas and into the adjoining portion of the product a second high-frequency electromagnetic alternating field having a respective second frequency such that the penetration depth of the second field is small compared to the penetration depth of the first field.

34 Claims, 5 Drawing Figures

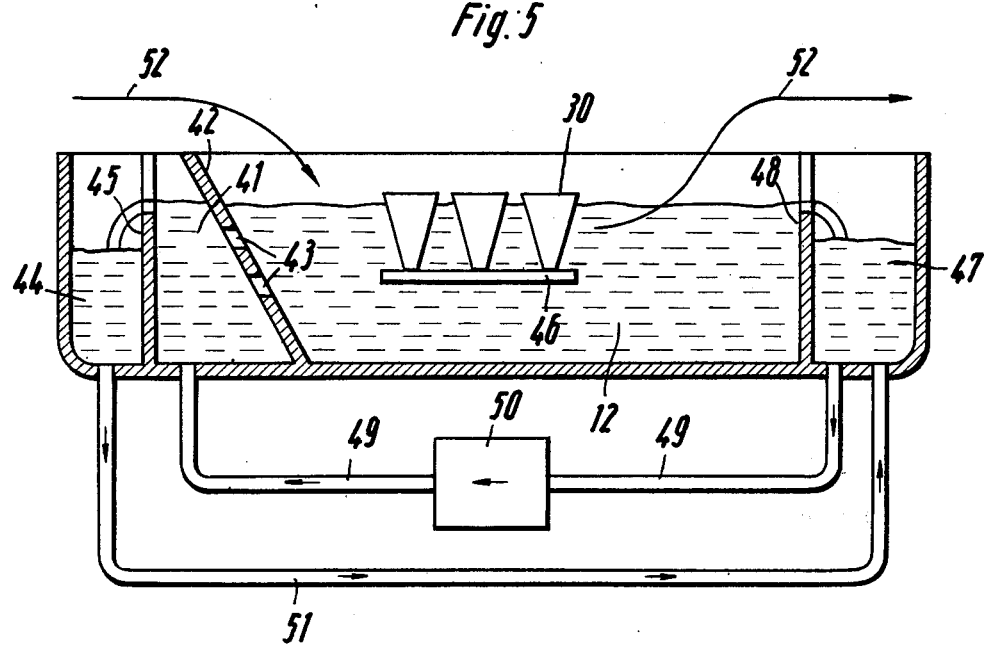

METHOD FOR EFFECTING UNIFORM HEATING OF AN ORGANIC PRODUCT PARTICULARLY FOR THE PURPOSE OF PRESERVING THE PRODUCT AND APPARATUS THEREFOR

BACKGROUND OF THE INVENTION

The invention relates to a method for uniformly heating, particularly for the purpose of preserving organic products or substances (referred to herein simply as "products" for the sake of brevity) in a container which can be penetrated by electromagnetic waves. The invention is intended to serve particularly for the heat treatment of preferably water-and/or albumin-containing foodstuffs and products intended for human consumption, such as for example dairy products, meat and internal organs.

Perishable products, especially organic substances, such as for example foodstuffs, are preserved, inter alia, by heat treatment. In order to avoid denaturing of the product, the heating must be preformed as carefully as possible. "Denaturing" is to be here understood as the loss of desirable ones of the original characteristics of the product such as cannot be restored, for example the loss of water-solubility of albumin as a result of coagulation in meat, in milk or in poultry.

With conventional processes (cooking, baking, autoclaving, grilling or frying) the heat energy is applied to the product in the form of contact heat or as infrared radiation. The heat is applied to the product from outside the product until the product is warmed through, i.e., until the temperature necessary for preservation is established in the innermost parts of the body or mass. The external surface and the outer parts of the body or mass are accordingly heated for a longer time and/or to a higher temperature than the more internally located layers. As a result, even with relatively small bodies or masses to be treated, it is impossible to avoid denaturing of at least parts of the outer layers, if the layers of the body or mass in the interior thereof are to be preserved.

Accordingly, contact heating and infrared radiation are suited in the main for the preservation of products, such as many meat and fish preserves, which suffer no loss of quality worth mentioning when subjected to prolonged and/or relatively intense heating.

When a product is heated by electromagnetic alternating fields the energy serving for the heating is not applied in the form of heat, but instead is converted into heat within the product itself, as a result of which there is produced a relatively uniform heating of all those parts of the product lying within the penetration depth of the field being used.

The penetration depth of the electromagnetic alternating field being used depends upon its frequency, as indicated by the following equation.

$$Zi = \frac{l_o}{2\pi(k')^{1/2}} \cdot \frac{2}{(1+\tan^2\delta)^{1/2}-1}{}^{1/2}$$

$Z$: is the penetration depth at which the energy density has decreased to $1/e$ its incident value; $k'$ is the dielectric constant of the product relative to vacuum ($\epsilon'/\epsilon_o$); and $l_o$ is the wavelength of the radiation in free space.

Since wavelength and frequency are inversely proportional to each other, the penetration depth decreases as the frequency is selected higher and higher.

For heating perishable products use is made of alternating electromagnetic fields (referred to herein for the sake of brevity as electromagnetic fields or simply as fields) which we can divide on the basis of frequency into two groups:

1. fields with ultra short waves and decametric waves, and
2. fields with centimeter waves and decimetric waves.

Both of these groups have characteristics which are of significance when these fields are used for the heat treatment of perishable products.

The relatively low-frequency fields of the first ultra short and decametric wave group (referred to hereafter as "first electromagnetic alternating fields" or for the sake of brevity as "first fields"), as can be derived from the foregoing equation, have a relatively large penetration depth which by appropriate selection of frequency can be readily adjusted for the process to be used, for the particular product to be treated, and for the product thickness. Generation of these fields requires only relatively little expense.

However, industrial use of fields with decametric and ultra short waves for the preserving of products results in practical problems: If large potential differences are established discharges frequently occur, then these can damage the product or render it useless. These potential differences result, inter alia, from the high field intensities necessary for the heating. Such discharges frequently occur at or near the boundary layers between the product to be treated and the surrounding air or other gas.

Special problems result from the use of fields of this frequency group for heating or preserving when there is gas present above the product in the container in which the product is located. In such cases, the discharges occur not only outside the container or wrapping but also within such gas, inside the container, resulting in perforation of the container walls.

With the fields of the second group there is no danger of such occurrences. On the other hand, these centimeter and decimetric waves, as can be derived from the foregoing equation, penetrate into only a relatively shallow layer located near the external surface of the body or mass to be treated. For example, the frequently employed frequency of 2.450 MHz results, in the case of red, lean meat, in a useful heating action to a depth of only about 20 millimeters, which seldom suffices for the preservation of foodstuffs. Additionally, relatively high expense is involved in the generation of fields of these frequencies.

SUMMARY OF THE INVENTION

One object of the invention is to provide a method for the heating and/or preservation of products of the type in question which reliably avoids the aforedescribed difficulties usually occuring with the use of electromagnetic fields.

This object, and others which will become more understandable from the detailed description below, can be met, according to one advantageous concept of the invention by taking the container which holds the product and in which there is a gas-filled space above the product and dipping the container into a fluid having a low dielectric loss factor tan $\delta$ to such an extent that the level of the fluid is somewhat below the upper side of the product being treated. The product is subjected to a first high-frequency electromagnetic alternating field, which is generated using electrodes arranged at opposite sides of the container, and which has a frequency selected sufficiently low that the field penetration depth for the product to be treated, considered in direction approximately normal to the electrodes, is greater than the thickness of the container inserted between the electrodes, considered in the aforementioned direction. The container is furthermore subjected from above to a second high-frequency electromagnetic alternating field whose frequency is selected so high as to result in a respective penetration depth which is small compared to the penetration depth of the first field.

In correspondence with the definition given above, the penetration depth for a particular product to be treated is that depth of penetration at which the energy density of the applied electromagnetic alternating field has decreased to $1/e$ of its original value.

The frequency of the first electromagnetic alternating field is preferably in the range between 3 and 300 MHz, i.e., in the decametric and ultra short wavelength range. The frequency of this first electromagnetic field must be so adjusted to the parameters of each application as to result in a sufficient penetration depth, in order to achieve penetration through the filled product container. If too high a frequency is selected, then only the fringe areas of the product located nearest to the "hot" electrode will be heated, with the deeper parts of the body or mass remaining at considerably lower temperatures. On the other hand, the selected frequency should be above 1 MHz for technological reasons. This first electromagnetic field is generated between two electrodes, so that the field be limited as exactly as possible to the actual treatment zone into which the product container is brought. The upper limit of the range of influence of the first electromagnetic alternating field upon the product is determined by the height of the upper surface level of the fluid surrounding the product container and can, for example, be increased or decreased by raising or lowering the liquid level in correspondence to the extent to which the container has been filled.

Since the effective region of the first electromagnetic field, on account of the danger of sparkovers, cannot extend all the way up to the upper surface of the product, and especially not further up into the gas-filled space in the container above the product, for the treating of these parts of the packaged product use must be made of a second electromagnetic field. This field need have only a relatively small penetration depth, since it need have an effect only upon the region at the upper side of the product not penetrated or incompletely penetrated by the first electromagnetic alternating field, and upon the gas-filled space above such region. Too large a penetration depth of the second electromagnetic field, as a result of superimposition upon the first electromagnetic field, could lead to excessive heating in parts of the product. The frequency of the second electromagnetic alternating field depends upon the desired or requisite penetration depth, which in turn depends upon the electrical characteristics of the product, the thickness of the region not penetrated or incompletely penetrated by the first electromagnetic alternating field, and upon the dimensions of the gas-filled space above the product.

For the second electromagnetic alternating field use is preferably made of frequencies in the range between 300 MHz and about 5 GHz, i.e., in the centimeter and decimetric wavelength range.

The container can have any of a very large variety of forms. At one extreme, it can completely surround the product; at the other extreme, it can be a mere support surface on which the product lies, with side walls being provided.

The electrodes for the first electromagnetic alternating field extend downwards at least as far as the lower side of the product.

Advantageously, these electrodes for the first alternating field are arranged vertically, oriented parallel to each other, and are of planar configuration. The shape of the product and its dielectric characteristics may however make it necessary to use a non-planar electrode configuration.

Above all, the product in its interior should have a relative dielectric constant $\epsilon$ and a dielectric loss factor tan $\delta$ of approximately uniform magnitude, and should have no gas inclusions. If the product has several large discrete constituent portions of markedly different respective relative dielectric constants and/or markedly different respective dielectric loss factors tan $\delta$, then these constituent portions must be finely subdivided and well intermixed so as to have an at least approximately statistical distribution within the mass of the product.

According to another advantageous concept of the invention, the electrodes for the first electromagnetic alternating field are arranged exteriorly of the tank for the low-dielectric-constant fluid, with the aforementioned tank being made of a material which can be penetrated by electromagnetic waves.

Treatment with the electromagnetic waves of both the different frequency ranges can be performed simultaneously or successively. The preferred low-dielectric-constant fluid is pure water.

Advantages of the invention are that by dipping the product into the fluid discharges associated with the low-frequency first field are avoided, and that with this arrangement the penetration depth of the higher-frequency second field suffices to establish in the parts of the container and of the product not penetrated by the first field a temperature equal to that established by the first field in those portions of the product penetrated by the latter, and in the same length of time, so that all portions of the product can be made to reach the same temperature substantially simultaneously.

Using the inventive method, it is possible to achieve a uniform heating which is predeterminable both with respect to temperature and heating time and which has an end value and a rise curve which can be varied, inter alia, by means of regulation of the circulation of the water bath. The expression "uniform heating" is intended to include final-temperature differences, as between inner and outer portions, or between upper and lower portions of the product to be heated, no greater than 4° to 5°C. Compared to conventional processes, the differences in temperature as between different portions of the product being heated are at any given moment very low. The temperature differences, particularly when large numbers of product items are involved, can be held to an order of magnitude of about 1°C, by making correspondingly precise adjustments of the parameters discussed above.

Thus, with the inventive method, the product is heated up, except for a thin layer at its upper side, by means of the more economical energy of the lower-frequency first electromagnetic alternating field, without the danger of discharges. The remaining relatively thin layer at the upper side of the product is heated up by the downwardly irradiated higher-frequency energy of the second electromagnetic alternating field, again with no possibility of discharges. In the gas-filled space above the body or mass of the product, small parts of the actual product, such as splashes or crumbs of the material of the product, or germs which have penetrated into the container, are penetrated by the lower-frequency energy and, like the product itself, heat treated.

The inventive method is particularly suited for mass-produced items, where all units have the same or at least similar physical characteristics, e.g., where, inter alia, the weight, starting temperature, dimensions, dielectric values and loss factors tan $\delta$ of the product as well as of the package or container are practically the same from one unit to the next. Bulk material units are usually enclosed in wrappers or containers made of glass or plastic. Such wrappers interfere only a little or not at all with the heat treatment, while they do serve to protect the product from dirtying or contamination.

The inventive method, in contrast to the usual conventional processes, does not require the wrapper or container to be entirely filled by the product; instead, the portion of the interior of the wrapper or container not filled with the product itself can be filled with a gas, such as air or nitrogen. Accordingly, the inventive method makes possible the preservation of the product in situations where the quality of the product is improved by the presence of such gas in the wrapper or container, and in situations where the product cannot be produced and packaged without the presence of such gas.

It is to be emphasized that the method is not limited in its applicability to the heating and/or preservation of packaged products. It has proved successful in the thawing of deep-frozen internal organs of slaughtered animals, such as for example pancreases, lungs, livers, etc. These organs need be stocked or preserved in deep-frozen state for only short times. After they are thawed, there are extracted from them secretions which are chemically very labile and above all very heat-sensitive, such as hormones, enzymes, etc., for use in the pharmaceutical industry and in medicine. When thawing such organs, it is important not merely to avoid overheating, even merely localized overheating, but also to complete the thawing operation as quickly as possible.

By way of experiment, deep-frozen animal organs, sorted according to type prior to freezing, were first finely subdivided in a specially designed grinder while still in deep-frozen condition. The still deep-frozen ground organs were then thoroughly mixed, yielding a product having sufficient homogeneity for the purposes of the inventive method.

This thoroughly mixed material was divided into units of identical weight and shape, and subjected to the inventive process while in a container open from above and made of material penetratable by the electromagnetic radiation used in the method. The product was, according to the requirements of the application, heated from −13°C. to −1°C, which includes the troublesome "thawing-warming range". The duration of the treatment amounted to 42 seconds. There resulted in the different parts of the product a maximum temperature variation of 1.5°C.

There will now be discussed, as a further example of the applications to which the inventive process can be put, the hitherto impossible preservation of yogurt in sealed plastic containers, with air being present in the interior of the containers above the yogurt.

Traditionally, yogurt is produced in such a way that milk, inocculated with Lactobacterium bulgaricus or Lactobacterium jogurti and with Streptococcus lactis, but otherwise as free as possible of germs, is filled into plastic containers, at a temperature of about 40° to 50°C, with the amount of milk dispensed being accurately measured to within about 1g. Because of the number of such containers to be filled with yogurt, the filling must proceed very fast, as a result of which the containers can be filled to only about 90 percent of their capacity. The filled container is immediately sealed with a cover foil; there accordingly exists in each container an air-filled space above the yogurt, containing aside from splashes of yogurt milk also saprophytic aerobic bacteria and mold spores as well as yeast cells. The enclosed milk is converted into yogurt during an incubation of the inocculated bacteria lasting about 3 to 3½ hours and occurring at about 45°C.

A metallic cover foil would interfere with the treatment using electromagnetic fields. Accordingly, instead of the otherwsie conventional coated aluminum foils, the inventive process makes use of non-metallic cover foils, which can consist, for example, of pure plastic, or of paper which has been impregnated, coated with plastic or lacquered.

The prior-art methods for prolonging the keeping quality of yogurt were very expensive (germ-free filling followed by cooling), had a denaturing action (short-lasting high-temperature heating of stirred yogurt on a plate heater), or were in any event unreliable (the known delicate cooling chains with transport and storage). All these methods guarantee neither a retardation of the reacidulation (pH value decrease) nor the neutralization of the germs present on the surface of the yogurt and in the gas-filled space above the yogurt.

It is accordingly one of the main objects of the invention to make possible the preserving of yogurt and similar or related products, while avoiding the above-described difficulties and disadvantages.

This object can be met, according to another advantageous concept of the invention, by guiding the yogurt-containing package after completion of the incubation operation through a tank of pure demineralized water in such a manner that the upper surface of the water in the tank is preferably 3 to 10 mm lower than the upper surface of the yogurt in the container, with the package or container being irradiated from above with electromagnetic centimeter and decimetric waves and from the sides with ultra short and decametric waves from electrodes immersed into the water. It is not of significance whether the upper edges of the electrodes project out from the water or not.

The advantage of the invention, when applied to the treatment of yogurt in this manner, is that, without the danger of even the slightest overheating of the highly sensitive product or its parts, the otherwise unavoidable pH value decrease is avoided, or at least greatly retarded, and this with a simultaneous marked killing or weakening the saprophytic germs and cells entering into the gas-filled space above the yogurt during filling of the yogurt containers.

As a result, still further advantages are achieved: The product shows no change of the albumin structure; the number of acid-forming bacteria remains remarkably stable in the vicinity of the lower limit of the norm (about $10^7$ ml); the pH value even in the case of more prolonged storage at about 20°C remains in the range between 4.2 and 4.6; vibration occurring during transport is tolerated very well; and no whey is produced. The water, which is preferably chemically pure (demineralized), absorbs much less energy than does the yogurt being treated. Ratios from 1:20 have been measured. Consumption wise, it was determined that of the total applied heat about 85 percent was attributable to the first and only about 15 percent to the second electromagnetic alternating field.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 5 is a schematic and partially sectioned illustration of an arrangement for preserving products, so designed that the containers are transported through a tank containing water flowing at a speed equal to the container transport speed.

DESCRIPTION OF THE PREFERRED EMBODIMENTS

Figure 1:
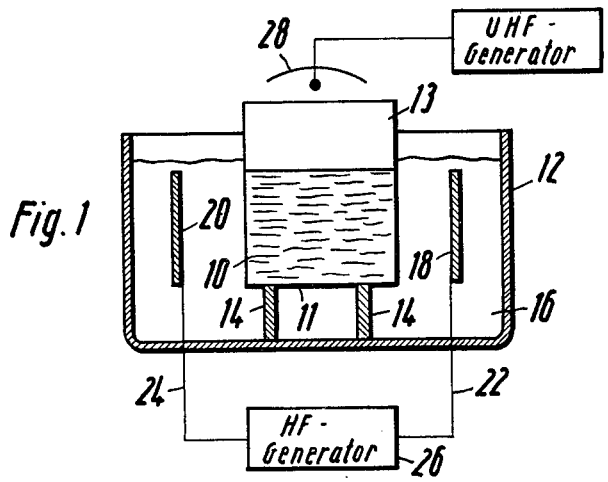
FIG. 1 is a section through an arrangement for preserving perishable products.

In FIG. 1, a product 10 is located in a container 11 made of a material which can be penetrated by electromagnetic waves. All packaging materials which provide marked shielding from electromagnetic waves are accordingly excluded, for example metallic foils. The materials for the container and possibly also for its cover are preferably synthetic plastics which advantageously should have a low loss factor tan $\delta$.

The product 10 can be any substance whose keeping quality can be increased by heating, particularly organic substances such as, for example, foodstuffs and certain medicines.

Inside the container 11 above the product 10 there is present a closed space 13 filled with a gas, for example air. In order to preserve the product 10, not only the product itself but also the gas and other substances present in the space 13 must be treated. Exemplary applications are yogurt in containers, juice in bottles, and other foodstuffs in cans, cups, etc.

The container 11, with the product 10 and the gas-filled space 13, in order to be treated, is dipped into a liquid 16, so that during the below-described treatment using electromagnetic waves in the range between 3 and 300 MHz discharges can be avoided. The tan $\delta$ value of the liquid otherwise should be as low as possible, in order to keep as low as possible its absorption of electromagnetic wave energy and in this way avoid losses of electric energy such as would occur if this energy were to markedly warm the water.

Additionally, the dielectric constant of the liquid 16 should be similar to that of the product 10, so that with water-containing products with a relative dielectric constant in the vicinity of 80 the liquid 16 can be water. Since water, particularly demineralized or distilled water, has a low tan $\delta$ value, the use of water as the liquid is preferred. Holding means 14 so position the container 11 in the liquid that the upper surface of the liquid is lower than the upper surface of the product 10.

Two electrodes 18 and 20 for the first field (referred to hereafter, for the sake of brevity, as the HF-electrodes), are connected via lines 22 and 24 with a high-frequency generator 26 having a frequency of 27.120 MHz (a frequency permitted for industrial purposes in West Germany). These electrodes 18, 20 are immersed in the liquid 16 in the tank 12. They are arranged at respective opposite sides of the container 11 and extend vertically downwards to at least the depth of the immersed container. The dimensions of the electrodes 18, 20 in the vertically upwards direction are not critical. According to one preferred concept, the top edges of the HF-electrodes 18, 20 too are below the upper surface of the liquid in the tank.

The upper ends of the HF-electrodes 18, 20 are preferably located at a lower level than the lowermost portion of the gas enclosed in container 11, or of the atmospheric air above the water. There exists no marked potential difference between this level and the bottom of the tank 12, because the liquid 16 fills the intermediate space between the individual containers as well as between the containers and the walls of the tank 12 and because the dielectric constant of the liquid differs insignificantly from that of the product 10. As a result the danger of sparkovers caused by the first electromagnetic alternating field is eliminated. The liquid 16 and the product 10 divided into individual units does constitute a mixture of different components; however, with respect to dielectric characteristics this mixture can in practice be considered as a single approximately homogeneous medium.

With this arrangement, when the two electrodes 18, 20 are supplied with HF-energy, there results a uniform heating of the product 10 in the container 11, with the exception of the gas-filled part thereof projecting above the HF-electrodes 18, 20. Furthermore, the liquid 16 absorbs energy from the first electromagnetic alternating field and becomes somewhat heated as a result, which serves to additionally provide for a uniform heating of the outside of the container 11.

The uppermost portions of the product 10 which, besides parts of the product also contain gas enclosed in the container 11, must be brought up to the same predetermined temperature as the more deeply immersed parts, and the temperature rise in these two parts should occur uniformly. Simultaneously, small parts of the product 10 suspended in the gas-filled space 13 or clinging to the inner walls of the upper part of the container 11, and also microorganisms, should be brought up to the desired temperature.

This is achieved by using, in addition to the aforedescribed HF-electrodes 18, 20 for effecting a horizontal irradiation of energy of the first electromagnetic alternating field, a parabolic UHF-radiator 28 arranged above the upper surface of the liquid 16. The radiator 28 effects an irradiation from above downwards with the second electromagnetic alternating field. If necessary, a plurality of parabolic radiators can be provided. Even with a frequency of 2.450 GHz (a frequency permitted for industrial purposes in West Germany), this radiation has a penetration depth sufficient to bring to the desired temperature, or to effect the desired heat treatment of, those upper portions of the container 11 and in particular of the gas-filled space 13 which are not sufficiently heated by the first electromagnetic alternating field. If necessary, the irradiation with the second electromagnetic alternating field can be performed with other frequencies, for example 915 MHz or 433 MHz. The radiation of the second electromagnetic alternating field thus penetrates not only the upper parts of the product 10 but also the gas-filled space 13 enclosed within the container 11, as well as any particles of the material of the product or any microorganisms which may be present in the latter.

Since waves having the frequency of the second electromagnetic alternating field and having the requisite field intensity do not cause discharges in air, in this frequency range damage to the container 11 and/or the product 10 therein is not to be feared.

The gases, for example air, in the empty space penetrated by the second electromagnetic alternating field are not warmed directly by radiation; however, due to contact with the product 10 and with the vapor rising from the product, there does occur a heat transfer resulting in a temperature increase of the gases, likewise.

To achieve reproducible results, the temperature of the liquid must be maintained constant. Since contamination of the liquid 16 increases its absorption of the energy of the first electromagnetic alternating field and can thus lead to an uncontrollable heating of the liquid, the liquid must be continuously purified, in order to keep its tan $\delta$ value low.

It is to be noted that the downwardly decreasing effectiveness of the second electromagnetic alternating field, attributable to its limited penetration depth, is offset by a downwardly increasing heating effectiveness of the first electromagnetic alternating field. In this way, the two different types of treatment, combined with each other, complement each other in the critical zone near the upper side of the product, in that their respective effectivenesses are added together.

Figure 2:
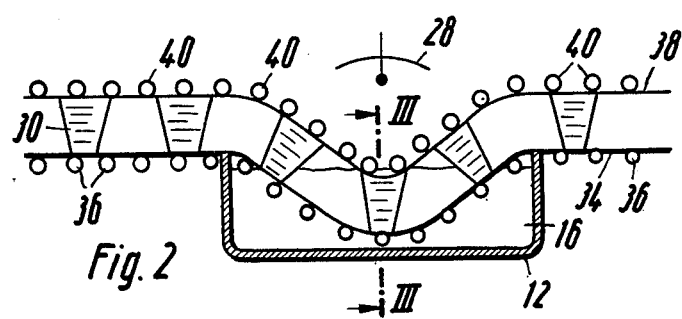
FIG. 2 is a section through an arrangement for preserving yogurt in closed containers.
Figure 3:
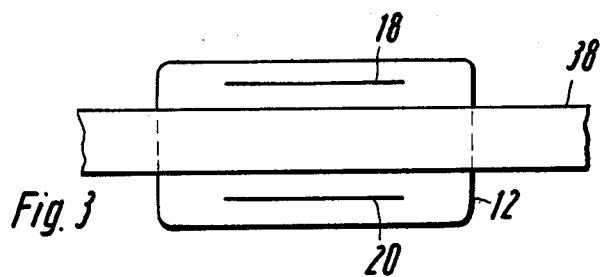
FIG. 3 is a top view of the arrangement of FIG. 1.
Figure 4:
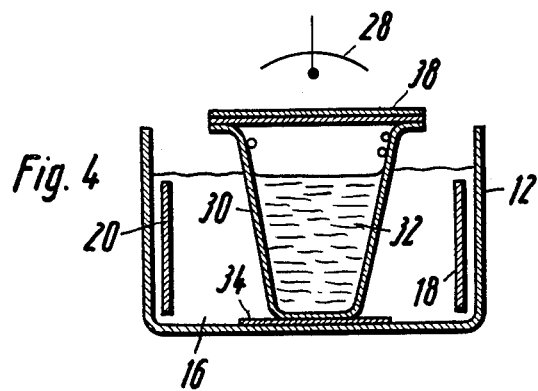
FIG. 4 is a section taken along line III—III of FIG. 2.

By way of example, the inventive process will be described as applied to the preserving of yogurt as illustrated in FIGS. 2–4.

The containers 30 filled with yogurt 32 are removed from the incubating chamber at a temperature of about 45°C. The containers 30 and their cover foils, both, are made of synthetic plastic. The containers 30 are conveyed by two transport belts 34, 38 arranged one above the other and travelling in synchronism with each other. The belts 34, 38 are made of a material having a very low dielectric constant and a very low tan $\delta$ value, for example tetrafluoroethylene ("Teflon"). The transport belts 34, 38 are supported by respective rollers or slide surfaces 36, 40. The two transport belts 34, 38 are so guided that they come into engagement with the containers 30 and exert upon the latter a considerable vertically directed pressure. In this way, the containers 30 are reliably held between the two transport belts 34, 38 and transported in the forwards direction.

The containers 30 are moved by the transport belts 34, 38 into a (non-illustrated) Faraday-shield-type treatment chamber whose purpose is to prevent the radiated energy from passing to outside the treatment chamber. In this chamber, the containers 30 traverse a tank 12 filled with water 16, irradiated from the side with the first and from above with the second electromagnetic alternating field. The spatial arrangement of the lateral HF-electrodes 18, 20 as well as that of the UHF radiator 28 located above the upper surface of the liquid corresponds to the illustration in FIG. 1, with the upper surface of the liquid being somewhat lower than the upper surface of the yogurt, up to 10 mm lower.

The radiated electromagnetic waves act upon the liquid 16. In order to keep the resulting energy loss low, use is made of water which is as chemically pure as possible and which can be provided in a relatively small amount by correspondingly configuring the tank 12. Furthermore, the liquid 16 is heated almost exclusively by the energy of the first electromagnetic alternating field which is relatively inexpensive due to the lower frequency.

The electromagnetic waves must raise the temperature of the yogurt by about 17°C, from the incubation temperature, which is about 45°C, to the end temperature of the treatment, which is about 62°C.

During the time interval during which the containers 30 and their contents are subjected to the effect of the electromagnetic waves, the temperature of the yogurt 32 rises to the desired treatment temperature which, as already mentioned, is about 62°C. The containers travel through the liquid tank 12, which is arranged in the aforementioned (non-illustrated) Faraday-shield-type chamber, in a time between 30 and 150 seconds.

To achieve a still more uniform heating of the containers 30 and the yogurt 32 therein, the liquid 16, according to a preferred concept of the invention, is maintained at a temperature of 45°C, so that the parts of the yogurt 32 in contact with the containers walls will not be too much cooled.

The containers 30 should have flat bottoms, to avoid formation of air cushions underneath the bottoms, since the presence of such air cushions could lead to sparkovers of the first electromagnetic alternating field.

After the treatment is completed, the containers 30 are freed as a result of the travel of the two transport belts 34, 38 away from each other, as considered in the vertical direction.

Long series of experiments have led to the determination that with the inventive manner of treatment the yogurt is rid of infections with mold fungi or their spores, yeast cells or Escherichia coli, but without any detrimental influence upon the albumin structure, appearance, taste or aroma of the yogurt. This applies not only to so-called plain or sour yogurt, but also to other varieties, such as fruit yogurt, yogurt drinks, and the like. The germ count of the acid-forming bacteria, such as Lactobacterium bulgaricus, Lactobacterium jogurti or Streptococcus lactis, is not only reduced but furthermore remains remarkably stable, even when the product is stored for several weeks uncooled at for example 20° to 25°C, and indeed quite near the lower limit of the germ counts usual in dairy products industry. Even the hitherto unavoidable reacidulation is arrested. In the case of treated fruit yogurt stored for a month at about 20°C, pH values of 4.26 to 4.28 were measured. Even in the just-mentioned case, no whey appeared. The superiority evidenced by these experimental results was confirmed by comparison with untreated control units.

The behavior of other dairy products, such as sour cream, kefir, curdled milk and soured milk, during and after the treatment, is either the same as or else very similar to that of yogurt.

In a further series of experiments, a product of a different type having different characteristics was selected, and an experimental arrangement differing in many details from the illustrated one was used. In order to make clear the broad applicability of the invention, beer, both in glass bottles and in synthetic plastic containers, was treated. Below, only the experiment using glass bottles is described, since the experiments using plastic containers yielded virtually identical results.

As frequently done in experiments with dairy products, the product was inocculated with those microorganisms which cause the most trouble in industrial production. In the case of beer the selected microorganisms were of course yeast cultures, lactic acid bacteria and sarcinae (pediococci).

Glass bottles each filled with 0.3 l of sterile, clear beer were each inoculated with either 24,000 to 120,000 lactic acid bacteria or with 6,000 to 30,000 yeast cells or with 4,000 to 20,000 sarcinae, and sealed with a synthetic plastic crown cork. The introduced germ counts represent a multiple of the amounts usually present in actual practice.

The thusly prepared beer bottles were treated not individually, but instead in groups of 20 bottles arranged in four-by-five-row synthetic plastic cases. This arrangement, coming closer to the needs of industry, necessitated certain modifications of the above-described and illustrated apparatus; these modifications served additionally for assessing the flexibility of the process.

The large and heavy units necessitated replacement of the aforedescribed transport belts 34, 38 by synthetic plastic chain conveyors provided with carrier elements. The upper transport belt was replaced by a hold-down frame. The large volume of the new twenty-bottle "units" made it necessary to cause the liquid in the tank to flow just as fast as the product moved through the treatment chamber. This was necessary in order to avoid formation of a "bow wave" and thus of an unintended local upwards shift of the action of the first electromagnetic alternating field.

Additionally, this arrangement made necessary a greater penetration depth of the electromagnetic alternating fields. This was achieved by decreasing the frequency of the field as described with respect to the examples above.

Since it was now necessary to penetrate four bottles, a frequency of 13.560 MHz was selected for the first electromagnetic alternating field. Because the bottles taper markedly in upwards direction at their upper sections, even quite small deviations of the volumetric content of the bottle from the nominal value resulted in marked variations of the upper surface level of the beer; in consideration of this factor, a frequency of 915 MHz was selected for the second electromagnetic alternating field.

The treated experimental units, together with the untreated control units, were stored for six weeks at a thermostatically controlled temperature of 30°C. After 14 days the control units without exception had become very turbid indicating an increase of the microorganisms; in contrast, even after 6 weeks the treated test units were still clear. Microscopic examination revealed that all the treated test units were germ free.

Since the goal in this case was sterility, and because the ability of the containers to withstand high temperature did not have to be taken into account, resort was had to final temperatures higher than would be used with dairy products. However, these higher temperatures were always kept considerably under 100°C.

FIG. 5 depicts a further embodiment of a treatment arrangement. Transport of the immersed containers through the tank creates a "bow wave". This bow wave is the more marked, the greater the container transport speed. The bow wave is particularly large when a plurality of containers supported on a single pallet are transported through the tank so as to be subjected to treatment with the electromagnetic waves. The bow wave, like every other type of wave or unintentional fluctuation of the upper surface level of the liquid, is disadvantageous, because it can result in an at least brief upwards shift of the zone of effectiveness of the first field up to the level of the gas-filled space above the product inside the container, which as explained before can lead to sparkovers. To avoid, to the extent possible, formation of a bow wave in the tank, which would make impossible an exact presetting of the level of the water in the tank, the arrangement is designed as follows: The tank 12, at the back side thereof at which containers 30 on a pallet 46 are introduced into the tank, has an antechamber 41 separated from the actual tank 12 by a separating wall 42. The antechamber 41 communicates with the tank 12 via a plurality of through-apertures 43 in the separating wall 42. An overflow chamber 44 is provided adjacent the antechamber 41, and water from the latter can flow over an overflow wall 45 into the overflow chamber 44. At the front side of the tank 12, where the containers after being treated with electromagnetic waves are removed from the tank, there is provided an overflow tank 47 separated from the treatment tank 12 by an overflow wall 48. The overflow tank 47 is connected with the antechamber 41 via a conduit 49 and a pump 50, through which water is pumped from the overflow tank 47 into the antechamber 41. The overflow tank 47 is connected with the overflow chamber 44 via a further conduit 51.

The arrangement of FIG. 5 is provided with HF-electrodes and with a UHF radiator in the same way as shown in FIG. 4 and described in the associated part of the specification, to which reference is made.

The arrangement of FIG. 5 operates as follows:

The pump 50 pumps water from the overflow tank 47 via the conduit 49 into the antechamber 41. From there the water flows via the through-apertures 43 in the separating wall 42 into the tank 12 and from there over the overflow wall 48 into the overflow tank 47. There is accordingly created in the tank 12 a left-to-right flow, as viewed in FIG. 5. The level of the upper surface of the water in tank 12 can be preselected by selecting the height of the overflow wall 48. The flow speed in the tank 12 depends upon the height of the upper surface of the water in the antechamber 41, and this height can be preselected by selecting the height of the overflow wall 45 from the antechamber 41 to the overflow chamber. The water in the overflow chamber 44 flowing over the overflow wall 45 can flow away to the overflow tank via the conduit 51.

The flow speed in the tank is advantageously exactly equal to the transport speed of the container 30 being transported through the tank on the pallet 46, the transport direction being indicated by the arrows 52. In this way it is possible to establish an essentially planar upper surface for the body of water in the tank 12, thereby preventing the danger of electrical sparkover due to water level shifts associated with a bow wave.

Instead of a single first electromagnetic alternating field use can also be made of a plurality of first electromagnetic alternating fields having different respective frequencies in the decametric and ultra short wave (meter) range. In the same way, instead of a single second electromagnetic alternating field, use can be made where it seems advantageous of a plurality of second electromagnetic alternating fields having different respective frequencies in the centimeter and decimetric wave range.

It will be understood that each of the elements described above, or two or more together, may also find a useful application in other types of methods and constructions differing from the types described above.

While the invention has been illustrated and described as embodied in methods and constructions for preserving yogurt and other dairy products, and beer, for thawing organic substances and animal organs, and for effecting heat treatments for a variety of specific purposes, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for effecting a uniform heating, particularly for the purpose of preserving, of an organic product located in a closed container in which a gas occupies the space inside the container above the product, comprising the steps of immersing the container into a liquid having a low dielectric loss factor to such an extent that the liquid level is somewhat below the upper side of the product in the container; using electrodes located to either side of the container to pass through the container from one side thereof to the other a first high-frequency electromagnetic alternating field having a respective first frequency such that the penetration depth of said first field is at least as great as the width of the container; from that side of said container at which the gas filled portion thereof is located passing into the container through the gas and into the adjoining portion of the product a second high-frequency electromagnetic alternating field having a respective second frequency such that the penetration depth of the second field is small compared to the penetration depth of the first field.

2. A method as defined in claim 1, wherein said first frequency is between about 1 MHz and about 300 MHz, and wherein said second frequency is between about 300 MHz and about 5 GHz.

3. A method as defined in claim 2, wherein said first frequency is 13.56 MHz.

4. A method as defined in claim 2, wherein said first frequency is 27.12 MHz.

5. A method as defined in claim 2, wherein said second frequency is between about 433 MHz and 915 MHz.

6. A method as defined in claim 2, wherein said second frequency is about 2.450 MHz.

7. A method as defined in claim 1, wherein said step of using electrodes to pass said first field through the container comprises immersing the electrodes in said liquid when passing said first field through the container.

8. A method as defined in claim 1, wherein the applied field intensity of said first field is between about 50 and about 400 V/cm.

9. A method as defined in claim 1, wherein the applied field intensity of said first field is approximately 200 V/cm.

10. A method as defined in claim 1, said steps being performed upon a gas-tightly sealed container.

11. A method as defined in claim 1, said steps being performed upon a gas-tightly sealed container in which said gas is air.

12. A method as defined in claim 1, said steps being performed upon a gas-tightly sealed container in which said gas is nitrogen.

13. A method as defined in claim 1, and further including the step of homogenizing said product to cause it to have a substantially uniform dielectric constant and loss factor prior to filling the product into the container and immersing the container in said liquid.

14. A method as defined in claim 13, wherein said step of homogenizing the product comprises finely dividing and mixing the product.

15. A method as defined in claim 1, wherein the steps of passing said first and second fields through said container are performed successively.

16. A method as defined in claim 1, wherein the steps of passing said first and second fields through said container are performed successively at different locations inside a tank filled with said liquid, and further including the step of moving the container through the liquid from one to the other of said different locations at a predetermined container transport speed, and causing the liquid to flow in the direction of container transport at a flow speed substantially equal to the container transport speed.

17. A method as defined in claim 1, further including the step of maintaining said liquid at a temperature at least approximately equal to the initial temperature of the container.

18. A method as defined in claim 1, wherein said step of immersing comprises using a liquid having a dielectric constant of the same order of magnitude as the dielectric constant of the product in the container.

19. A method as defined in claim 1, wherein sai step of immersing comprises using a liquid having a dielectric constant approximately equal to the dielectric constant of the product in the container.

20. A method as defined in claim 1, said steps being performed upon a container filled except for the gas filled space with a dairy product, and wherein said step of immersing comprises using water for said liquid.

21. A method as defined in claim 1, said steps being performed upon a container filled except for the gas filled space with yogurt, and wherein said step of immersing comprises using water for said liquid.

22. A method as defined in claim 21, further including the step of subjecting the yogurt in the container to incubation and completing such incubation prior to said step of immersing.

23. A method as defined in claim 21, wherein the first and second fields have such respective field intensities and are passed through said container for respective times such that the yogurt in the container is brought to a final temperature between about 56° and about 75°C.

24. A method as defined in claim 23, the yogurt being brought to a final temperature between 58° and 64°C.

25. A method as defined in claim 23, further including the step of maintaining said water at a temperature between 30° and 65°C.

26. A method as defined in claim 25, the water being maintained at a temperature of 45°C.

27. A method as defined in claim 1, wherein said step of immersing comprises using a conveyor to transport the container through a tank containing said liquid and holding the container on the conveyor immovable with respect to the conveyor during such transport.

28. A method for effecting a uniform heating, particularly for the purpose of preserving, of an organic product located in a closed container in which a gas occupies the space inside the container above the product, comprising the steps of immersing the container into a liquid having a low dielectric loss factor to such an extent that the liquid level is above at least part of the product inside the container; passing through the container from one side thereof to the other a first high-frequency electromagnetic alternating field having a respective first frequency such that the penetration depth of said first field is at least as great as the width of the container, but limiting the height of the region through which said first field passes to a level below the lower boundary of the gas filled space inside the container, to prevent penetration by said first field through said gas in such a manner as could result in sparkovers; and passing through the container from above the gas filled portion thereof a second high-frequency electromagnetic field having a respective second frequency higher than said first frequency and sufficiently high to preclude sparkovers across said gas and having a penetration depth extending down into substantially only that portion of the product in said container not penetrated by said first field, whereby the decreasing field intensity of said second field in direction deeper and deeper into the product is complemented by the increasing field intensity of the first field in such direction so as to result in uniform heating of the product in the container.

29. A method as defined in claim 28, wherein said limiting of the height of the region through which said first field passes is accomplished by maintaining the level of said liquid below the lower boundary of the gas filled space inside the container.

30. A method as defined in claim 28, wherein said limiting of the height of the region through which said first field passes is accomplished by maintaining the level of said liquid below the upper side of the product inside the container.

31. A method as defined in claim 28, wherein said limiting of the height of the region through which said first field passes is accomplished by maintaining the level of said liquid below the lower boundary of the gas filled space inside the container and establishing said first field using electrodes immersed in said liquid.

32. A method as defined in claim 28, wherein said step of immersing comprises immersing the container to such an extent that the liquid level is slightly above the lower boundary surface of the gas above the product in the container.

33. A method as defined in claim 28, wherein said limiting of the height of the region through which said first field passes comprises limiting the height of such region to substantially just below the lower boundary surface of the gas above the product in the container, whereby to maximize the fraction of said product which can be penetrated by said first field and minimize the fraction of said second field so as to optimize cost when the energy furnished by said second field is costlier than that furnished by said first field.

34. An apparatus for effecting a uniform heating, particularly for the purpose of preserving, of an organic product located in a closed container in which a gas occupies the space inside the container above the product, comprising, in combination, a tank containing a liquid having a low dielectric los factor; transporting means for transporting such containers into and then out of said liquid and for holding the containers in the liquid immersed to such an extent that the liquid level is somewhat below the upper side of the product in the containers; first field generating means operative for passing through a container located at a predetermined position in said tank from one side of such container to the other a first high-frequency electromagnetic alternating field having a respective first frequency such that the penetration depth of said first field is at least as great as the width of the containers transported by said transporting means; second field generating means operative for passing through a container located at a predetermined position in said tank from above the container a second high-frequency electromagnetic alternating field transverse to said first field and having a respective second frequency greater than said first frequency and such that the penetration depth of said second field corresponds approximately to the depth of the part of the product which is located above the liquid level in said tank during penetration of said container by said first field.

* * * * *